US012151485B2

(12) United States Patent
Takenaga et al.

(10) Patent No.: US 12,151,485 B2
(45) **Date of Patent: *Nov. 26, 2024**

(54) PRINTING APPARATUS AND APPARATUS

(71) Applicant: CANON KABUSHIKI KAISHA, Tokyo (JP)

(72) Inventors: Ken Takenaga, Kanagawa (JP); Tetsu Hamano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 17/852,253

(22) Filed: Jun. 28, 2022

(65) Prior Publication Data

US 2022/0410602 A1 Dec. 29, 2022

(30) Foreign Application Priority Data

Jun. 29, 2021 (JP) ................................ 2021-108167

(51) Int. Cl.
*B41J 25/34* (2006.01)
*B41J 25/308* (2006.01)

(52) U.S. Cl.
CPC ....... *B41J 25/3082* (2013.01); *B41J 25/3088* (2013.01)

(58) Field of Classification Search
CPC ........................................................ B41J 25/34
See application file for complete search history.

(56) References Cited

U.S. PATENT DOCUMENTS

2012/0169816 A1* 7/2012 Iwata ..................... B41J 2/1752 347/86
2020/0384763 A1* 12/2020 Seki ........................... B41J 2/14

FOREIGN PATENT DOCUMENTS

JP H9-086012 A 3/1997
JP 2006305808 A 11/2006
JP 2013-039796 A 2/2013

* cited by examiner

*Primary Examiner* — Scott A Richmond
(74) *Attorney, Agent, or Firm* — Canon U.S.A., Inc. IP Division

(57) ABSTRACT

A printing apparatus includes a support member having a bearing portion, and includes a locking member including a shaft portion fitted to the bearing portion and a biasing member arranged to bias the support member and the locking member in a first direction. The support member supports a printing member that prints on a printing medium. The locking member is pivotally mounted to the support member. The shaft portion is a pivot center. The locking member fixedly holds the printing member relative to the support member. The first direction forms an angle from 0 degree to smaller than 45 degrees relative to an upper surface of the printing member in a first state in which the printing member is fixedly held relative to the support member by the locking member. Movement of the shaft portion fitted to the bearing portion in the first direction is restricted by the biasing member.

17 Claims, 12 Drawing Sheets

PRINTING APPARATUS AND APPARATUS

BACKGROUND

Field

The present disclosure relates to a printing apparatus and to an apparatus.

Description of the Related Art

There is known an ink jet printer (ink jet printing apparatus) including a printing head to eject ink. The ink jet printing apparatus performs a printing operation in a state in which the printing head is mounted to a carriage. Japanese Patent Laid-Open No. 2006-305808 discloses an ink jet printing apparatus of the type that the printing head is fixedly held in the carriage by a head set cam pressed downward by a head set spring.

However, the structure disclosed in Japanese Patent Laid-Open No. 2006-305808 accompanies with a possibility that the size of the ink jet printing apparatus in a height direction may increase because the head set spring for fixedly holding the printing head in the carriage is pressed downward.

SUMMARY

The present disclosure provides a printing apparatus capable of suppressing an increase in apparatus size in the height direction.

According to an aspect of the present disclosure, a printing apparatus includes a support member including a bearing portion and supporting a printing member configured to perform printing on a printing medium, a locking member, including a shaft portion fitted to the bearing portion, which is pivotally mounted to the support member with the shaft portion being a pivot center, and configured to fixedly hold the printing member relative to the support member, and a biasing member arranged to restrict movement of the shaft portion fitted to the bearing portion in the first direction and arranged to bias the support member and the locking member in a first direction that forms an angle of 0 degree or greater and smaller than 45 degrees relative to an upper surface of the printing member in a first state in which the printing member is fixedly held relative to the support member by the locking member.

Further features of the present disclosure will become apparent from the following description of exemplary embodiments with reference to the attached drawings.

DESCRIPTION OF THE EMBODIMENTS

First Embodiment

Figure 1:
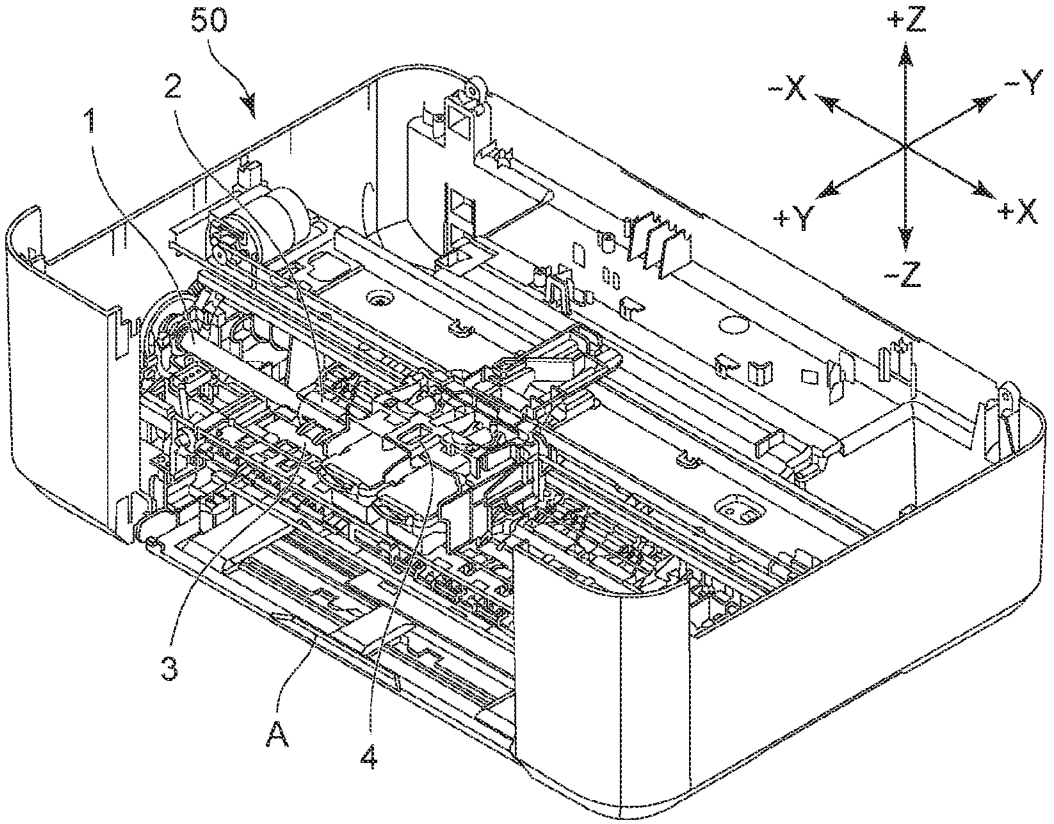
FIG. 1 is a perspective view of an ink jet printing apparatus according to a first embodiment.

First, an outline of an ink jet printing apparatus according to the present disclosure is described. FIG. 1 is a schematic perspective view of an ink jet printing apparatus 50 (hereinafter referred to as a "printing apparatus 50") according to a first embodiment. In the printing apparatus 50, printing media loaded on a feed cassette A disposed in a front portion of the printing apparatus 50 are fed by a feed roller (not illustrated) one by one. Then, each printing medium is gripped between a conveying roller 1 and a pinch roller 2 in association with the conveying roller 1 and is conveyed in the +Y direction with rotation of the conveying roller 1 while the printing medium is guided over and supported by a platen 3. The conveying roller 1 is a metal roller processed such that fine irregularities are formed on a roller surface to generate great frictional force. The pinch roller is resiliently biased toward the conveying roller 1 by a pressing member such as a spring (not illustrated).

A printing head 5 includes an ink ejection portion 56 (see FIGS. 4B and 4C) through which ink given as a liquid containing a color material is ejected, and the platen 3 is disposed at a position facing the ink ejection portion 56 of the printing head 5. The platen 3 support the printing medium at a rear surface to maintain a certain distance or a predetermined distance between the ink ejection portion 56 of the printing head 5 and a front surface of the printing medium facing the ink ejection portion 56. The printing head 5 performs printing on the printing medium conveyed to the platen 3, and after the completion of the printing, the printing medium is discharged to the outside of the printing apparatus 50.

The printing head 5 (see FIGS. 4A, 4B and 4C) is mounted to the carriage unit 4, and the carriage unit 4 is operated to reciprocate in the X direction by a driver such as a motor. The carriage unit 4 including the printing head 5 mounted thereto is also referred to as a printing unit. The printing head 5 includes an ink cartridge portion (not illustrated) and the ink ejection portion 56 (see FIGS. 4B and 4C). The X direction indicates a direction orthogonal to a conveying direction of the printing medium (namely, to the Y direction) in a horizontal plane.

The printing head 5 ejects ink droplets while moving in a main scan direction together with the carriage unit 4 and prints an image corresponding to one band on the printing medium on the platen 3. After the printing of the image corresponding to one band, the printing medium is conveyed through a predetermined distance in the conveying direction by the conveying roller (intermittent conveying operation).

By repeating the printing operation for one band and the intermittent conveying operation as described above, an entire image is printed on the printing medium in accordance with image data.

Figure 2A:
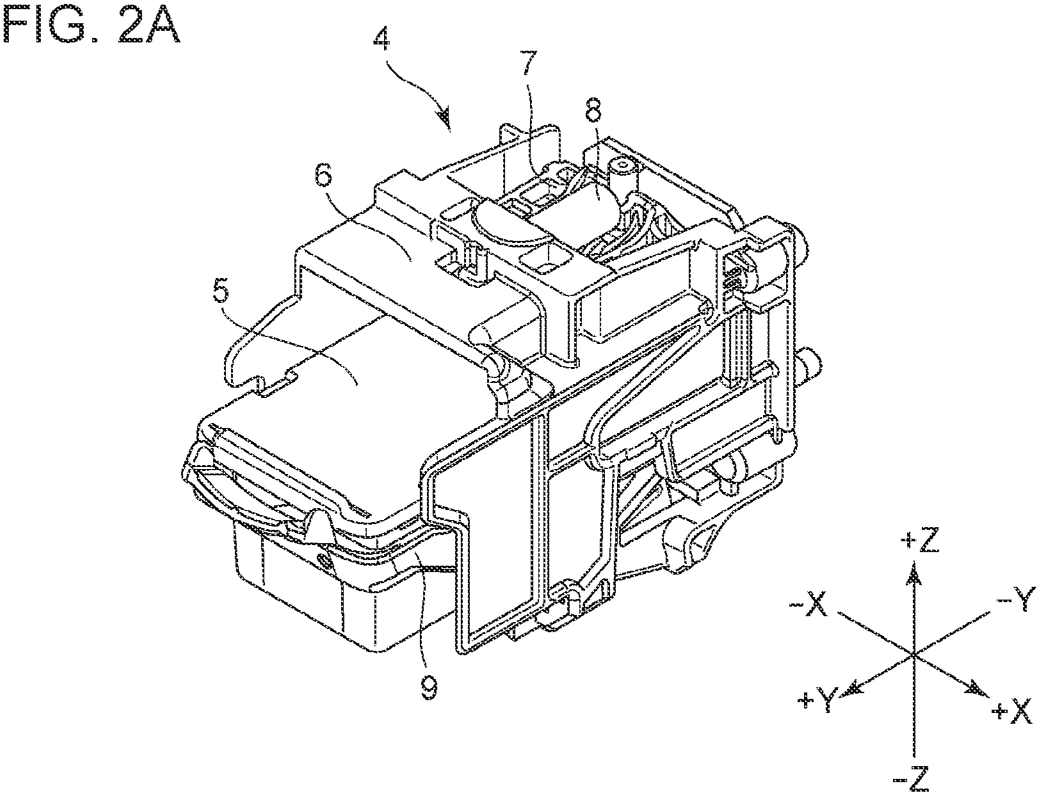
FIGS. 2A and 2B are each a perspective view of a carriage unit in the first embodiment.
Figure 2B:
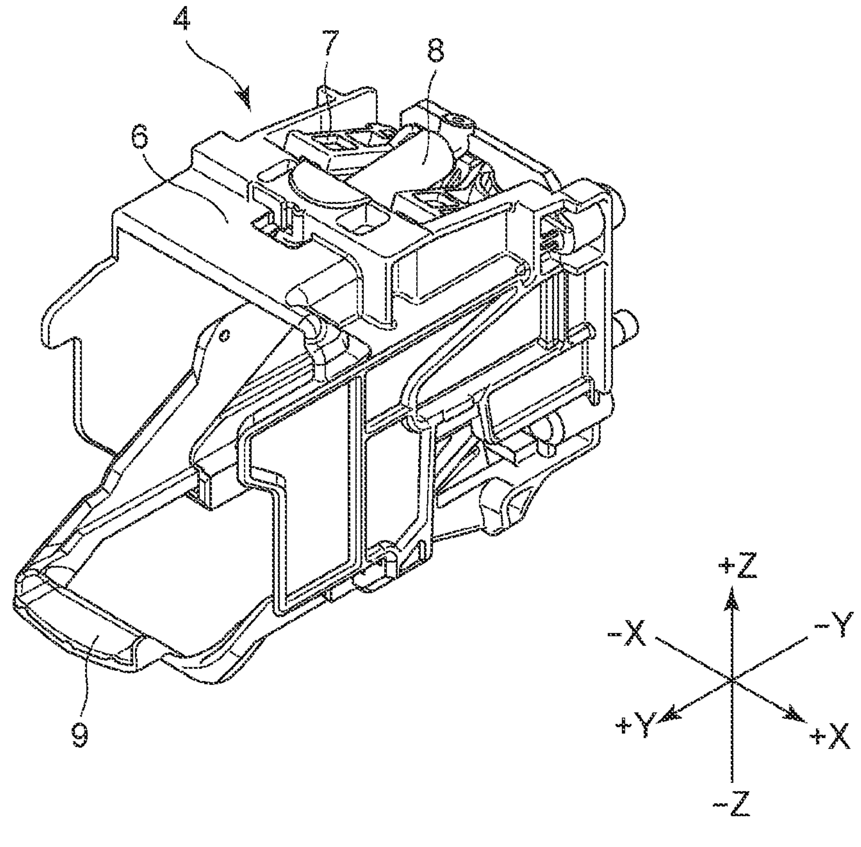

FIGS. 2A and 2B are each a perspective view of the carriage unit 4 in the first embodiment. The carriage unit 4 includes the printing head 5, a carriage 6, a head set cam 7, and a head set lever 9. The printing head 5 is removably inserted (detachably attached) to the carriage 6 serving as a support member and is fixedly held in a predetermined position within the carriage 6 by the head set cam 7 serving as a locking member. The head set cam 7 is biased by a tension spring 8 serving as a biasing member to fixedly hold the printing head 5 in the carriage 6 with the biasing.

When the head set cam 7 is in a lock state illustrated in FIG. 2A, the printing head 5 is fixedly held in the carriage 6. On the other hand, when the head set cam 7 is in an unlock state illustrated in FIG. 2B, the printing head 5 can be detached (removed) from the carriage 6. The head set cam 7 is pivotally moved between the lock state and the unlock state in conjunction with an operation of the head set lever 9 serving as an operating member that can be operated by a user.

Figure 3A:
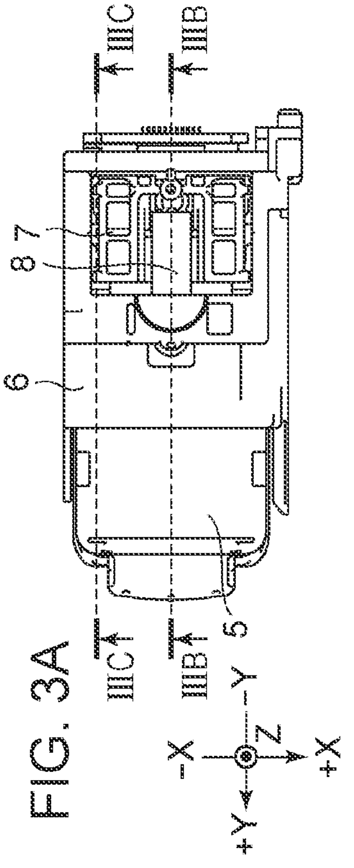
FIGS. 3A, 3B, 3C, 3D, 3E and 3F are plan views and sectional views of the carriage unit when a head set cam is in a lock state and an unlock state in the first embodiment.
Figure 3B:
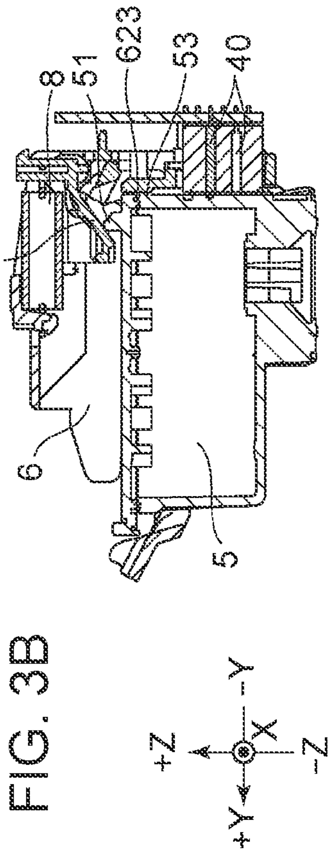

FIGS. 3A, 3B, 3C, 3D, 3E and 3F are plan views and sectional views of the carriage unit 4 when the head set cam 7 is in the lock state and the unlock state. FIG. 3A is a plan view when looking at the carriage unit 4 from above in the Z direction with the head set cam 7 being in the lock state. FIG. 3B is a sectional view when looking at a cross-section of the carriage unit 4 cut along a line IIIB-IIIB in FIG. 3A from the +X direction. When the head set cam 7 is in the lock state, a press receiving portion 51 of the printing head 5 and a cam face 73 of the head set cam 7 contact each other. Moreover, an abutting portion 53 of the printing head 5 and an abutting portion 623 of the carriage 6 abut each other. At that time, a substrate 55 (see FIG. 4B) serving as an electric substrate for the printing head 5 and a connector 40 serving as an electrical connection portion of the carriage 6 contact each other to establish electrical connection.

Figure 3C:
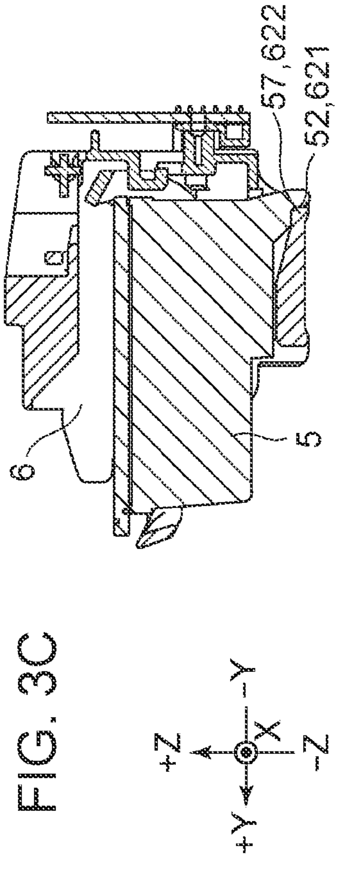

FIG. 3C is a sectional view when looking at a cross-section of the carriage unit 4 cut along a line IIIC-IIIC in FIG. 3A from the +X direction. When the head set cam 7 is in the lock state, abutting portions 52 and 57 of the printing head 5 and abutting portions 621 and 622 of the carriage 6 abut each other respectively. With the structures illustrated in FIGS. 3A to 3C, the printing head 5 is fixedly held in the carriage 6.

Figure 3D:
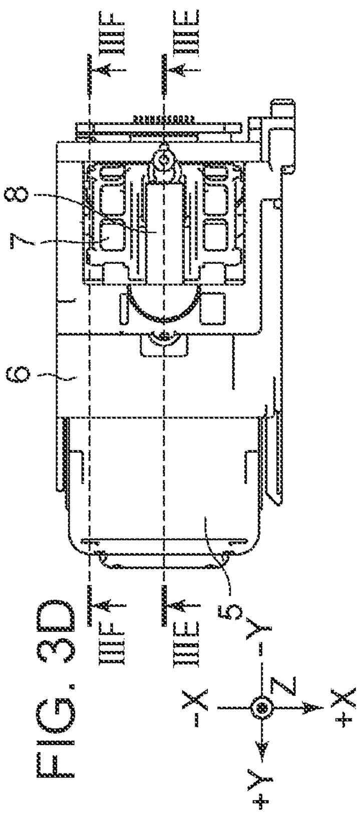
Figure 3E:
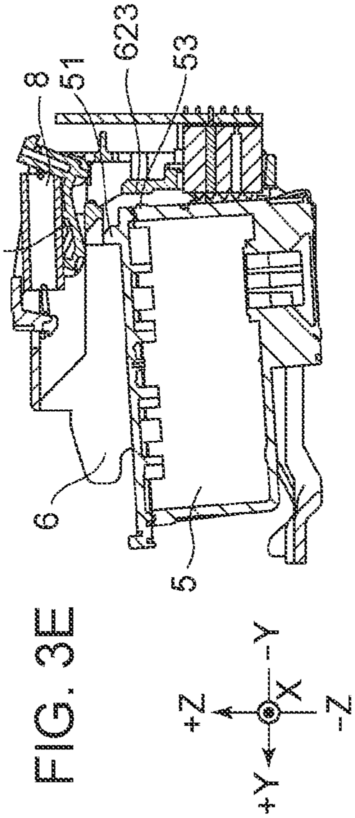

FIG. 3D is a plan view when looking at the carriage unit 4 from above in the Z direction with the head set cam 7 being in the unlock state. FIG. 3E is a sectional view when looking at a cross-section of the carriage unit 4 cut along a line IIIE-IIIE in FIG. 3D from the +X direction. When the head set cam 7 is in the unlock state, the cam face 73 of the head set cam 7 is in a state having moved to an upper position in the Z direction than when the head set cam 7 is in the lock state, and is apart from the press receiving portion 51 of the printing head 5. Moreover, the abutting portion 53 of the printing head 5 does not abut the abutting portion 623 of the carriage 6 and is apart from the abutting portion 623. At that time, the substrate 55 in the printing head 5 and the connector 40 in the carriage 6 are apart from each other.

Figure 3F:
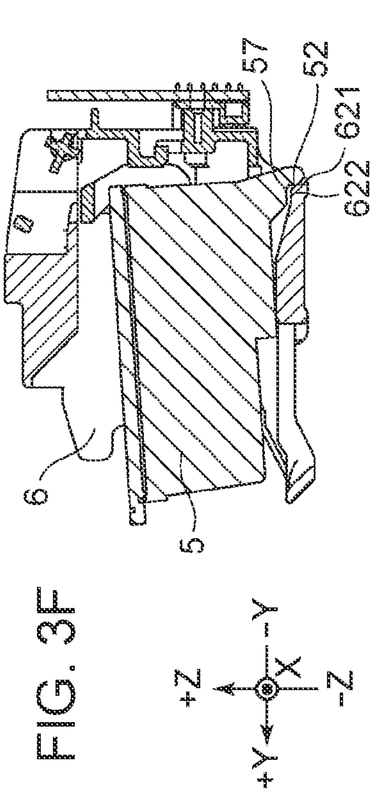

FIG. 3F is a sectional view when looking at a cross-section of the carriage unit 4 cut along a line IIIF-IIIF in FIG. 3D from the +X direction. When the head set cam 7 is in the unlock state, the abutting portions 52 and 57 of the printing head 5 are apart from the abutting portions 621 and 622 of the carriage 6, respectively, without abutting them. With the structures illustrated in FIGS. 3D to 3F, the printing head 5 is detachable from the carriage 6.

Figure 4A:
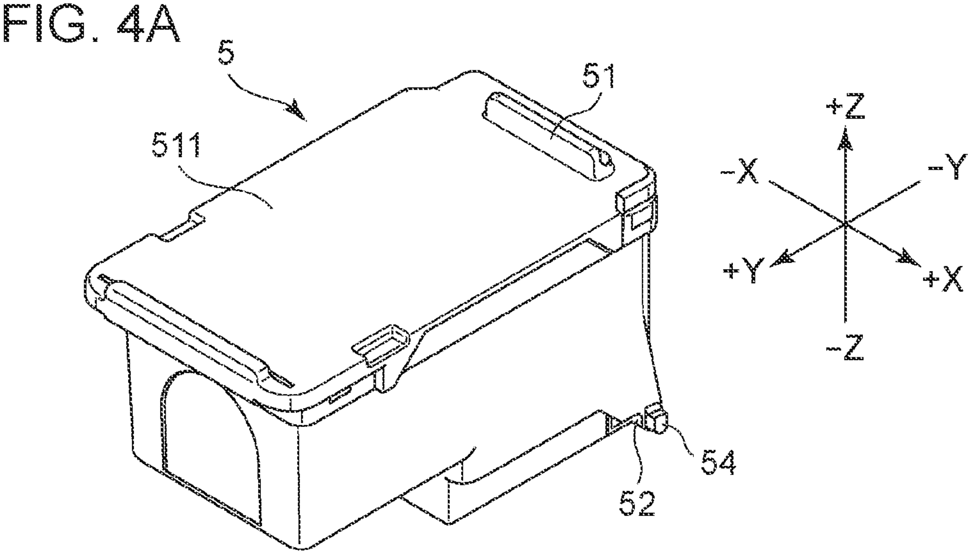
FIGS. 4A, 4B and 4C are each a perspective view of a printing head in the first embodiment.
Figure 4B:
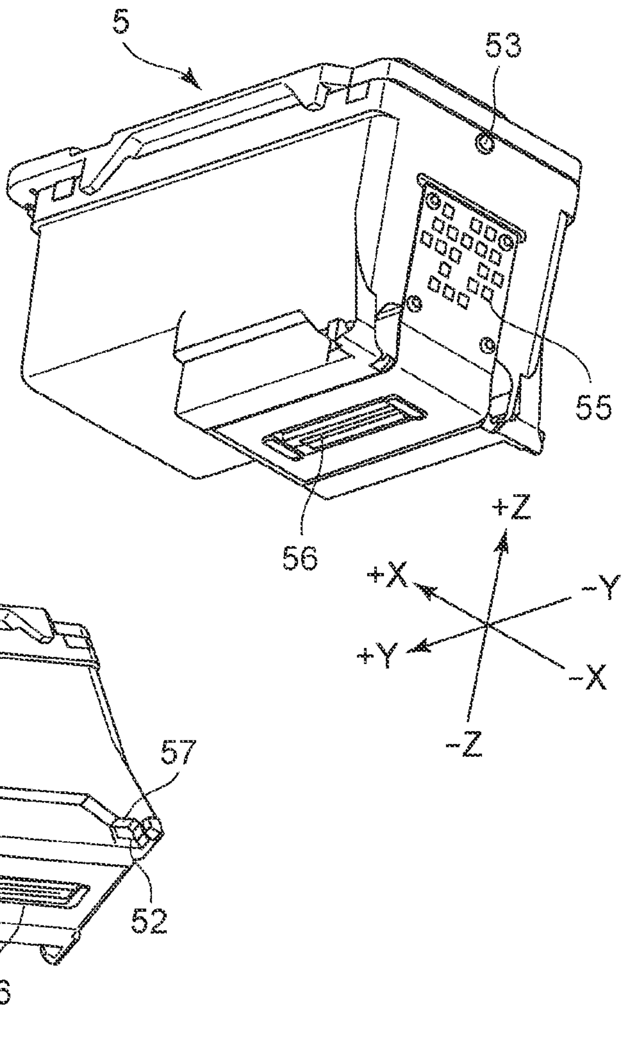
Figure 4C:
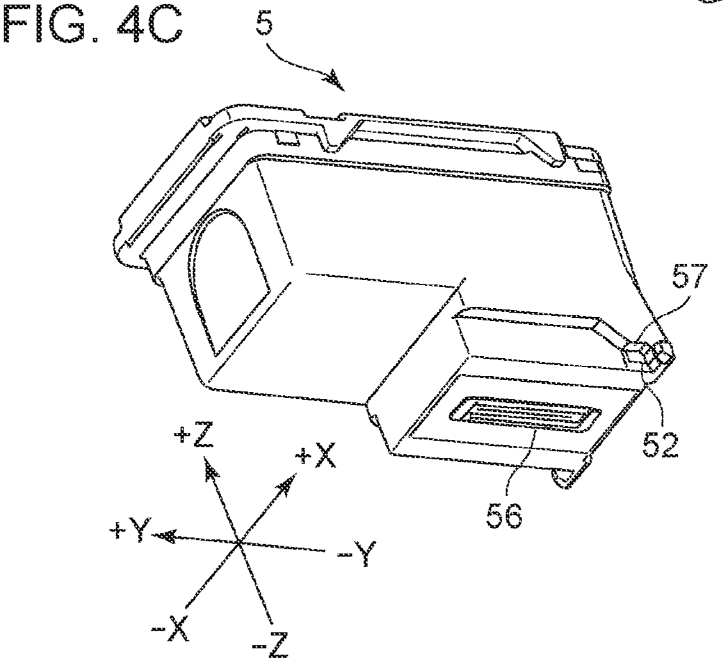

FIGS. 4A, 4B and 4C are each a perspective view of the printing head 5. FIG. 4A is an external perspective view when looking at the printing head 5 from the +Z direction, and FIG. 4B is an external perspective view when looking at the printing head 5 from the −Y direction.

FIG. 4C is an external perspective view when looking at the printing head 5 from the −Z direction. The printing head 5 includes the ink ejection portion 56 provided with the press receiving portion 51 disposed on its upper surface 511 and with ejection openings (not illustrated) formed in its bottom surface, the ejection openings ejecting ink therefrom. The printing head 5 further includes the abutting portions 52, 53 and 57 arranged to abut the abutting portions 621, 623 and 622 of the carriage 6, respectively, when the head set cam 7 is in the lock state. In addition, the printing head 5 includes a guide rib 54 sliding along a guide 61 (see FIG. 5B) of the carriage 6 in contact therewith when the printing head 5 is inserted into the carriage 6.

Figure 5A:
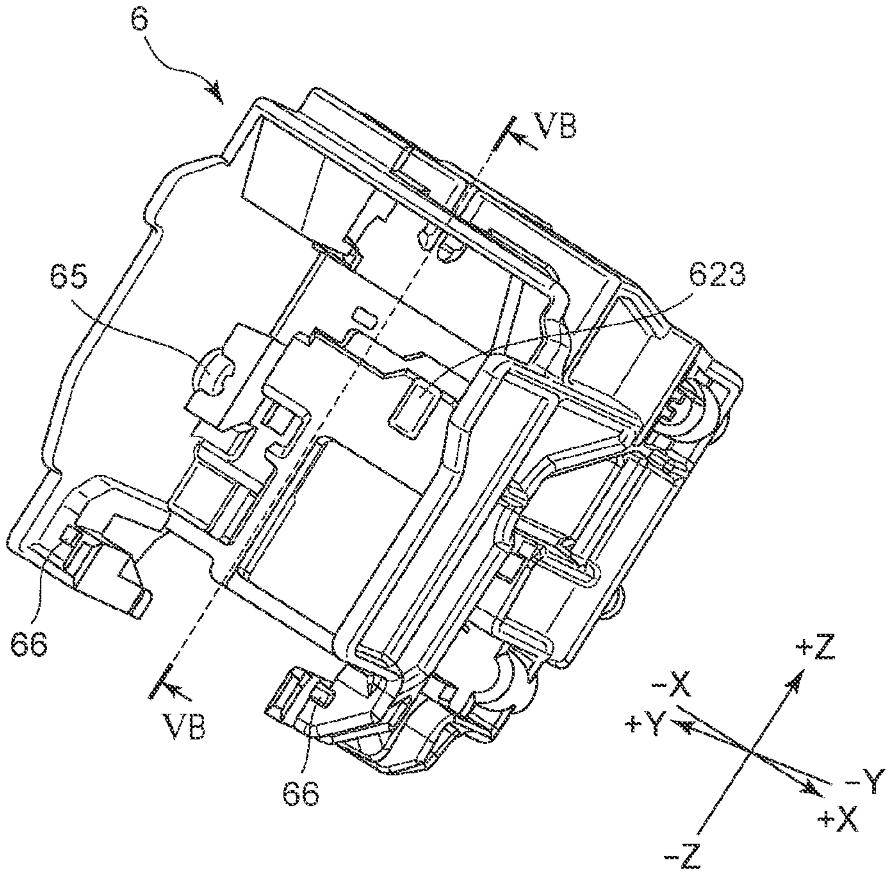
FIGS. 5A and 5B are an external perspective view and a sectional view, respectively, of a carriage in the first embodiment.
Figure 5B:
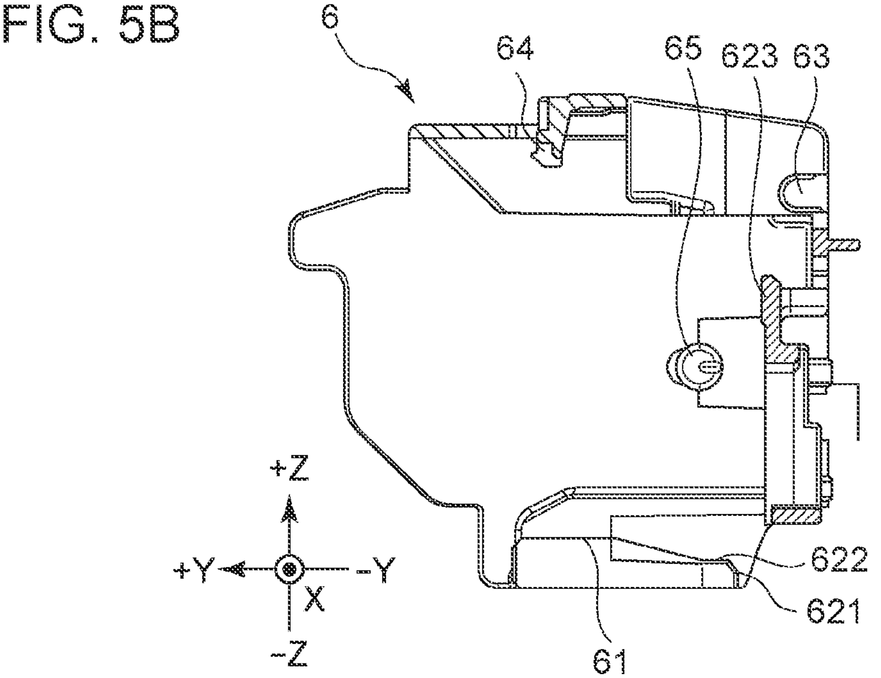

FIG. 5A is an external perspective view of the carriage 6. FIG. 5B is a sectional view when looking at a cross-section of the carriage 6 cut along a line VB-VB in FIG. 5A from the +X direction. The carriage 6 includes the guide 61 with which the guide rib 54 of the printing head 5 contacts, and the abutting portions 621, 622 and 623 arranged to abut the abutting portions 52, 53 and 57 of the printing head 5, respectively.

The carriage 6 further includes a pivot shaft bearing portion 63 to which a pivot shaft 72 (see FIGS. 7A and 7C) serving as a shaft portion of the head set cam 7 is fitted, and a spring attachment portion 64 serving as a connecting portion to which a hook 82 (see FIG. 8) of the tension spring 8 is attached.

In addition, the carriage 6 includes a pivot center shaft 65 that is engaged in an engagement portion 91 (see FIGS. 6A and 6B) of the head set lever 9. Moreover, the carriage 6 includes an abutting portion 66 against which an abutting portion 92 (see FIG. 6B) of the head set lever 9 abuts when the head set cam 7 is in the unlock state.

Figure 6A:
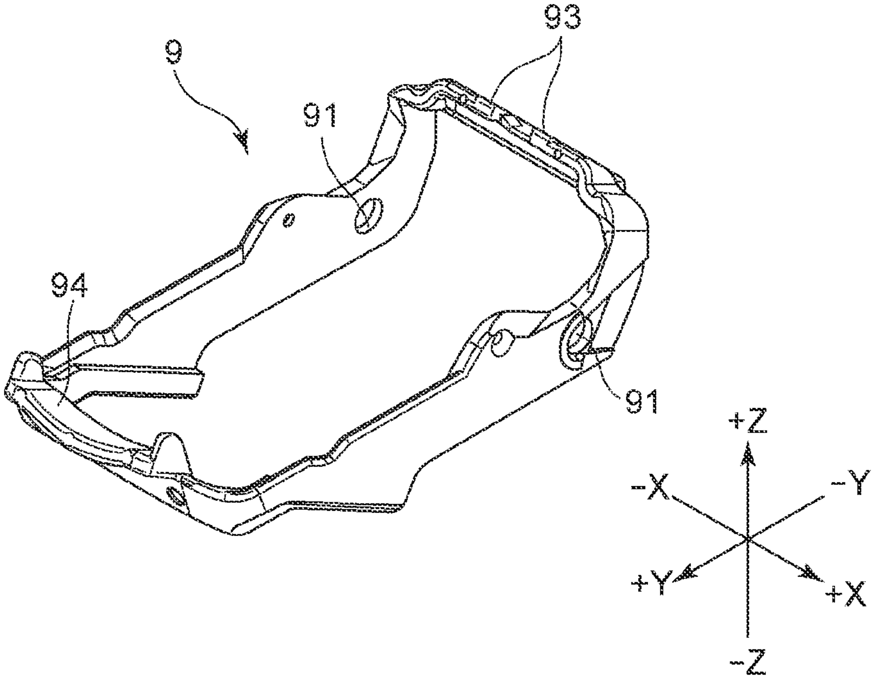
FIGS. 6A and 6B are each a perspective view of a head set lever in the first embodiment.
Figure 6B:
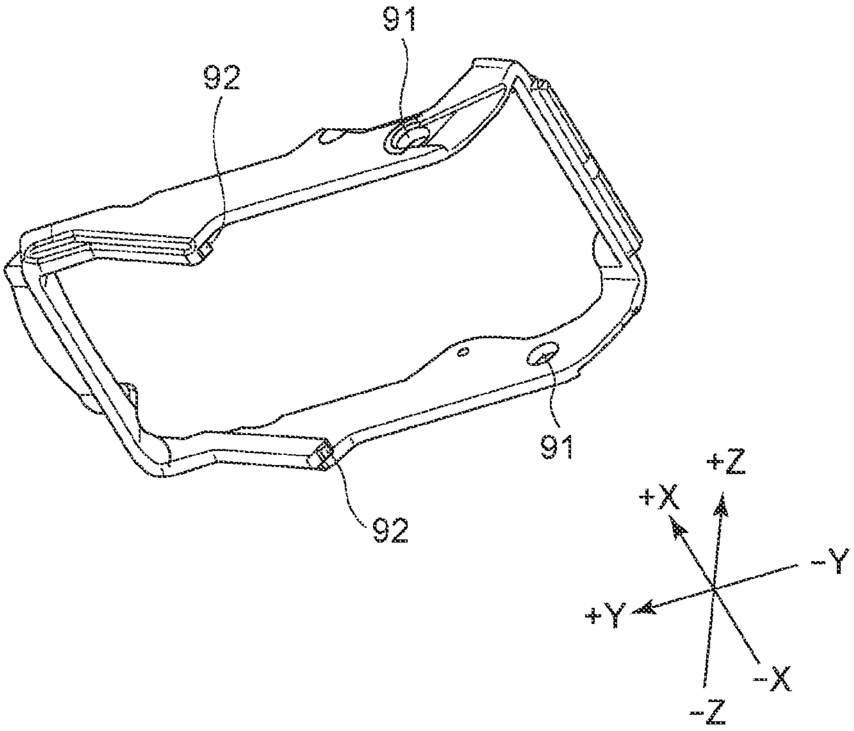

FIGS. 6A and 6B are each a perspective view of the head set lever 9 in the first embodiment. FIG. 6A is a perspective view when looking at the head set lever 9 from the +Z direction, and FIG. 6B is a perspective view when looking at the head set lever 9 from the −Z direction. The head set lever 9 includes the engagement portion 91 and the abutting portion 92. Although described in detail later, the head set lever 9 further includes a rib 93 arranged to contact a cam face 74 (see FIGS. 7B and 7C) of the head set cam 7. In addition, the head set lever 9 includes a grip portion 94 that is manipulated by a user to operate the head set lever 9 in a state mounted to the carriage unit 4.

Figure 7A:
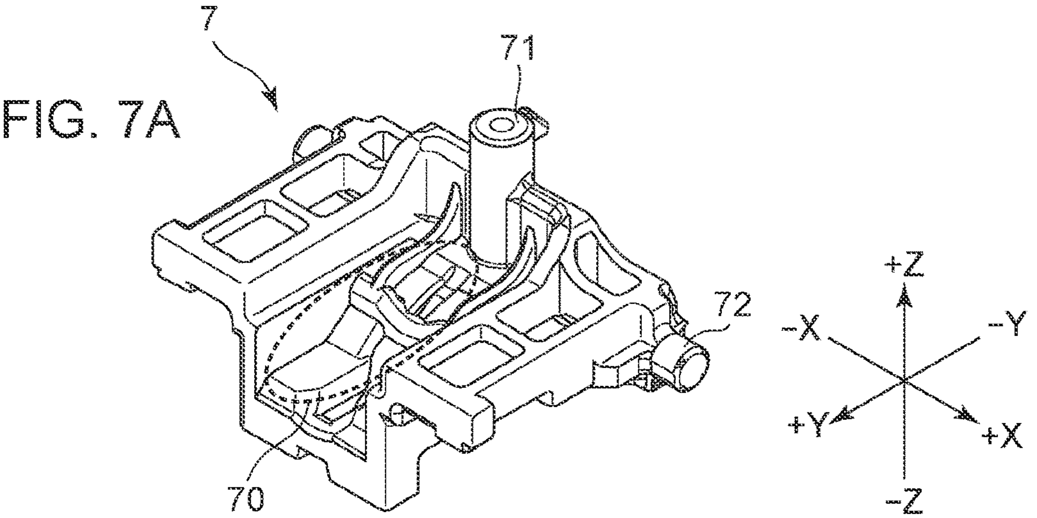
FIGS. 7A, 7B and 7C are each an external view of the head set cam in the first embodiment.
Figure 7B:
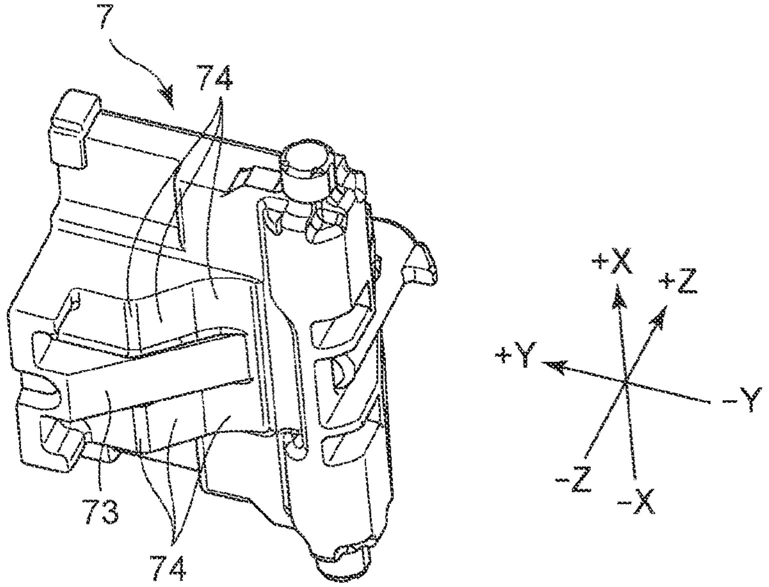
Figure 7C:
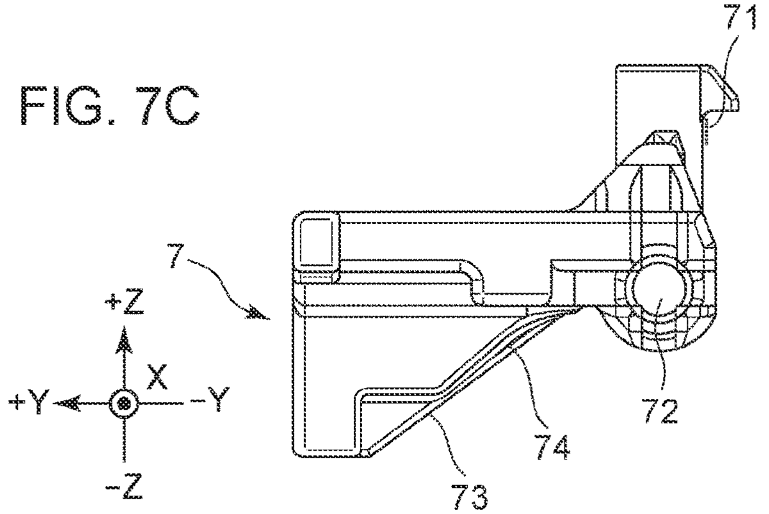

FIGS. 7A, 7B and 7C are each an external view of the head set cam 7. FIG. 7A is an external perspective view when looking at the head set cam 7 from the +Z direction, and FIG. 7B is an external perspective view when looking at the head set cam 7 from the −Z direction. FIG. 7C is an external view when looking at the head set cam 7 from the +X direction. The head set cam 7 has the role of fixedly holding the printing head 5 in the carriage 6. In this embodiment, for example, when the head set cam 7 is in the lock state illustrated in FIG. 2A, the printing head 5 is fixedly held in the carriage 6.

When the head set cam 7 is in the unlock state illustrated in FIG. 2B, the printing head 5 is detachable from the carriage 6 because the locking of the printing head 5 to the carriage 6 is released. In the state in which the head set cam

7 is mounted to the carriage 6, the head set cam 7 is pivotally movable between the lock state and the unlock state about the pivot shaft 72.

The head set cam 7 includes a spring attachment portion 71 serving as a connecting portion to which a hook 81 (see FIG. 8) of the tension spring 8, namely the biasing member, is attached. In the state in which the head set cam 7 is mounted to the carriage 6, the tension spring 8 is disposed in a central portion 70. The central portion 70 is a storage portion in the shape of a recess formed in the head set cam 7. This provides a structure that the tension spring 8 does not interfere with the pivotal movement of the head set cam 7 because the tension spring 8 is disposed in the central portion 70.

The head set cam 7 further includes the pivot shaft 72 about which the head set cam 7 is pivotally moved between the lock state and the unlock state. The pivot shaft 72 is fitted to the pivot shaft bearing portion 63 of the carriage 6, thereby supporting the head set cam 7 in a pivotally movable manner The head set cam 7 has the cam face 73. When the head set cam 7 is in the lock state, the cam face 73 contacts the press receiving portion 51 of the printing head 5 and fixedly holds the printing head 5 in the carriage 6.

The head set cam 7 further has the cam face 74 contacting the rib 93 of the head set lever 9 when the head set cam 7 is pivotally moved from the lock state to the unlock state. Specifically, when the head set cam 7 is pivotally moved from the lock state to the unlock state, or when the head set cam 7 is pivotally moved in a fashion reversed to the above, the rib 93 of the head set lever 9 contacts the cam face 74 and slides over the same.

In the related art, the cam face 74 is formed in the shape defined by interconnecting multiple flat surfaces. However, when the cam face 74 is formed by the multiple flat surfaces, the rib 93 of the head set lever 9 may be caught at a boundary between the flat surfaces forming the cam face 74. On that occasion, because the head set lever 9 is operated by the user, operation force required for the user to apply may be locally increased in some cases depending on the caught condition of the rib 93.

In this embodiment, the cam face 74 is formed as a curved surface as illustrated in FIG. 7C. This enables the rib 93 of the head set lever 9 to slide over the cam face 74 without being caught during the sliding motion.

Therefore, the operation force to be applied by the user to operate the head set lever 9 is stabilized, and the burden on the user is reduced.

Figure 8:
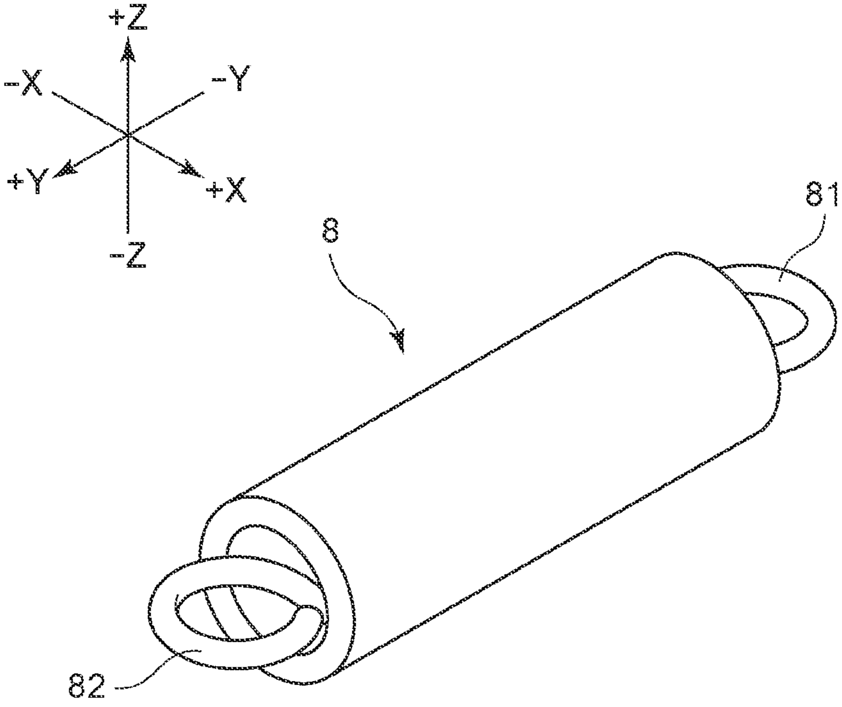
FIG. 8 is a perspective view of a tension spring in the first embodiment.

FIG. 8 is a perspective view of the tension spring 8. The tension spring 8 includes the hook 81 attached to the spring attachment portion 71 of the head set cam 7 and the hook 82 attached to the spring attachment portion 64 of the carriage 6.

The tension spring 8 is mounted to the carriage unit 4, as illustrated in FIGS. 2A and 2B, with the hook 81 and the hook 82 attached to respectively the spring attachment portion 71 and the spring attachment portion 64. As a result, the head set cam 7 and the carriage 6 are both biased by the tension spring 8.

In the state in which the printing head 5 is fixedly held in the carriage 6, the tension spring 8 is desirably mounted substantially parallel to an upper surface 511 of the printing head 5. Specifically, in this embodiment, in the state in which the printing head 5 is fixedly held in the carriage 6, the tension spring 8 is desirably mounted to the carriage unit 4 to extend in a connecting direction in which the substrate 55 and the connector 40 of the carriage 6 are connected to each other. Furthermore, the connecting direction in which the substrate 55 and the connector 40 of the carriage 6 are connected to each other is desirably a direction intersecting the vertical direction.

In this embodiment, since the tension spring 8 is mounted without protruding from the carriage unit 4 in the Z direction, the size of the carriage unit 4 in the height direction (Z direction) can be reduced.

Figure 9A:
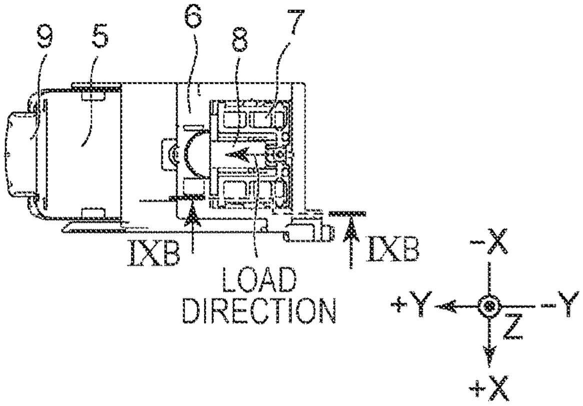
FIGS. 9A, 9B, 9C, 9D, 9E and 9F are plan views and sectional views of the carriage unit when the head set cam is pivotally moved to the lock state and the unlock state in the first embodiment.
Figure 9B:
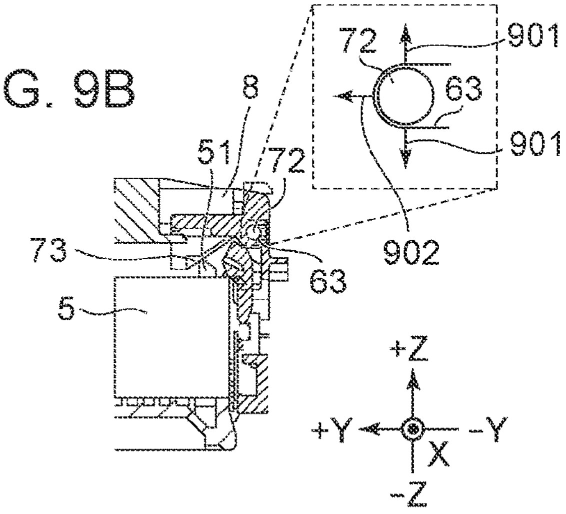

FIGS. 9A, 9B, 9C, 9D, 9E and 9F are plan views and sectional views of the carriage unit 4 when the head set cam 7 is pivotally moved to the lock state and the unlock state. FIG. 9A is a plan view of the carriage unit 4 when the head set cam 7 is in the lock state. FIG. 9B is a sectional view when looking at a cross-section of the carriage unit 4 cut along a line IXB-IXB in FIG. 9A from the +X direction. An area denoted by a dotted line in FIG. 9B represents a conceptual view illustrating directions in which the pivot shaft 72 of the head set cam 7 is restricted.

When the head set cam 7 is in the lock state, the press receiving portion 51 of the printing head 5 contacts the cam face 73 of the head set cam 7 and receives a load from the cam face 73. On the other hand, the cam face 73 of the head set cam 7 also receives a load from the press receiving portion 51 of the printing head 5. At that time, the pivot shaft 72 of the head set cam 7 is positioned to contact an inner bottom end of the pivot shaft bearing portion 63 of the carriage 6 on the +Y direction, whereby a variation in position of the pivot shaft 72 caused by the load applied to the cam face 73 is suppressed. Specifically, the position of the pivot shaft 72 in the Z direction (denoted by 901) is restricted by the pivot shaft bearing portion 63 as illustrated in the dotted-line area in FIG. 9B. In addition, the position of the pivot shaft 72 in the Y direction (denoted by 902) is restricted by both the pivot shaft bearing portion 63 and the tension spring 8.

Figure 9C:
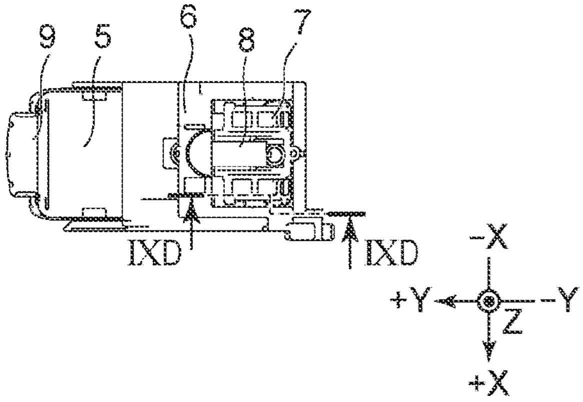
Figure 9D:
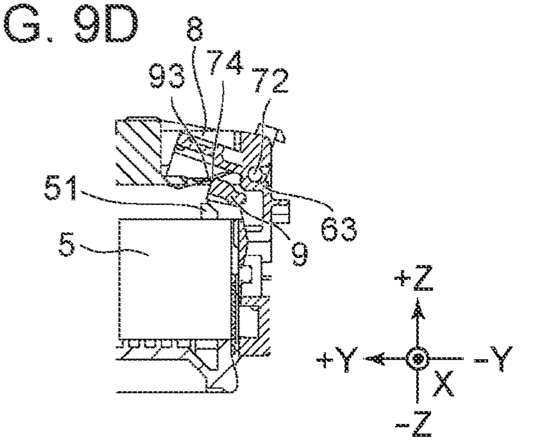

FIG. 9C is the plan view of the carriage unit 4 when the head set cam 7 is positioned in an intermediate state between lock state and the unlock state. FIG. 9D is a sectional view when looking at a cross-section of the carriage unit 4 cut along a line IXD-IXD in FIG. 9C from the +X direction. In the intermediate state between lock state and the unlock state, the rib 93 of the head set lever 9 contacts the cam face 74 of the head set cam 7. Also in this intermediate state, the position of the pivot shaft 72 of the head set cam 7 is restricted in the Y direction and the Z direction as in the lock state.

Figure 9E:
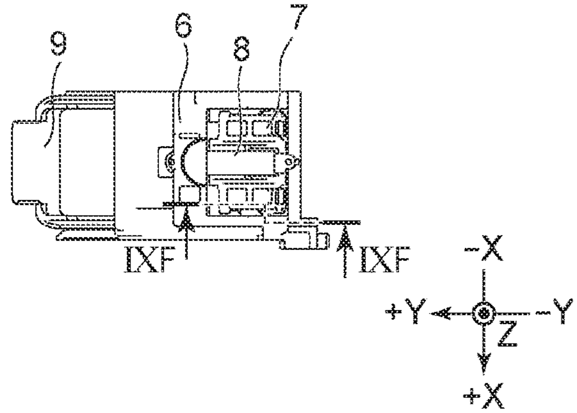
Figure 9F:
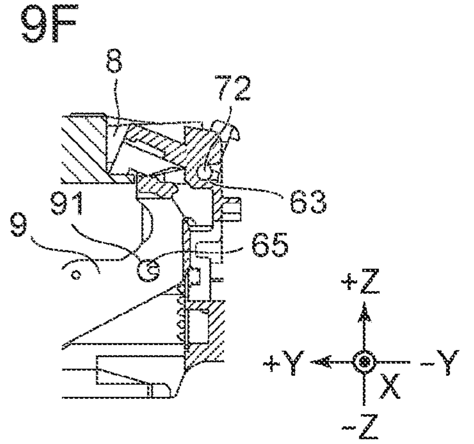

FIG. 9E is the plan view of the carriage unit 4 when the head set cam 7 is positioned in the unlock state. FIG. 9F is a sectional view when looking at a cross-section of the carriage unit 4 cut along a line IXF-IXF in FIG. 9E from the +X direction. Also in the unlock state, the position of the pivot shaft 72 of the head set cam 7 is restricted in the Y direction and the Z direction as in the lock state.

As seen from FIGS. 9A to 9F, the position of the pivot shaft 72 of the head set cam 7 is always restricted by the pivot shaft bearing portion 63 of the carriage 6. With that restriction, since the position of the pivot shaft 72 in the Y direction and the Z direction is stabilized even when the cam face 73 of the head set cam 7 is brought into contact with the press receiving portion 51 of the printing head 5, the load applied to the press receiving portion 51 from the cam face 73 is also stabilized. Thus, when the head set cam 7 is pivotally moved to the lock state, the printing head 5 can be fixedly held in the carriage 6 in a stable fashion.

In the related art, a long compression spring extending and contracting in the Z direction is used as the biasing member for the head set cam 7. Using the compression spring increases the height of the carriage unit 4 in the Z direction, thus increasing the height of the printing apparatus 50 as well. By contrast, in this embodiment, since the tension spring 8 applying the load in the substantially Y direction is used as the biasing member for the head set cam 7, the biasing member can be disposed in a posture lying in an XY plane direction.

As a result, the height of the carriage unit 4 in the Z direction can be reduced, and the height of the printing apparatus 50 can also be reduced. In this embodiment, the wording "the substantially Y direction" indicates a direction that is substantially parallel to the upper surface 511 of the printing head 5 and is aligned with the connecting direction between the substrate 55 and the connector 40 of the carriage 6 in the state in which the printing head 5 is fixedly held in the carriage 6.

The substantially Y direction includes a direction forming an angle relative to the XY plane. The tension spring 8 may be mounted to the head set cam 7 in a state inclined to form an angle relative to the XY plane. In that case, the load applied from the tension spring 8 is represented by component forces in both the Y direction and the Z direction. In the structure of this embodiment, the position of the pivot shaft 72 can be stabilized with the tension spring 8 applying the load in the Y direction. When an inclination of the tension spring 8 relative to the XY plane is smaller than 45 degrees, the component force applied from the tension spring 8 in the Y direction is greater than that in the Z direction, and hence the load can be applied in the Y direction. Thus, the tension spring 8 is desirably mounted to the head set cam 7 in a state inclined at an angle of smaller than 45 degrees relative to the XY plane.

Alternatively, the biasing member for the head set cam 7 may be the tension spring 8 arranged to apply the load, for example, in the substantially X direction. The substantially X direction indicates a direction substantially orthogonal to the Y direction in the XY plane. In other words, a similar effect can be obtained with the biasing member for the head set cam 7 applying the load in any direction parallel to the XY plane without being limited to the X direction. Also in such a case, the inclination of the tension spring 8 toward the Z direction is desirably smaller than 45 degrees.

As described above, this embodiment provides the printing apparatus capable of preventing an increase in apparatus size in the height direction.

Second Embodiment

A second embodiment will be described below, but description of similar components to those in the above first embodiment is omitted.

Figure 10A:
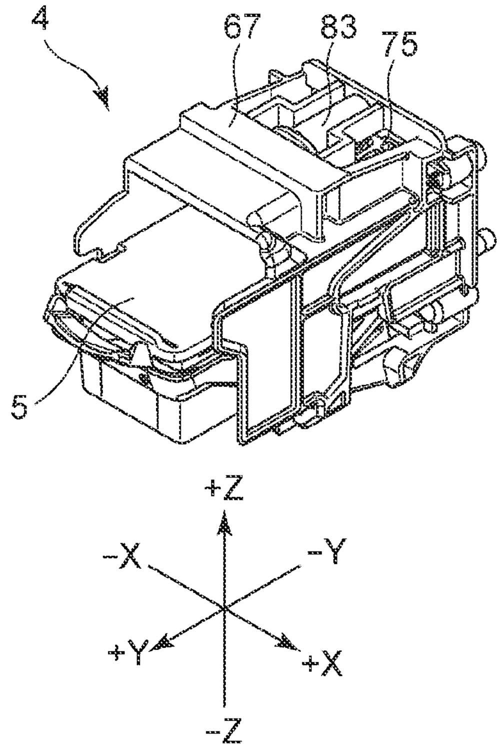
FIGS. 10A, 10B, 10C and 10D are perspective views illustrating a carriage unit and components thereof in a second embodiment.
Figure 10B:
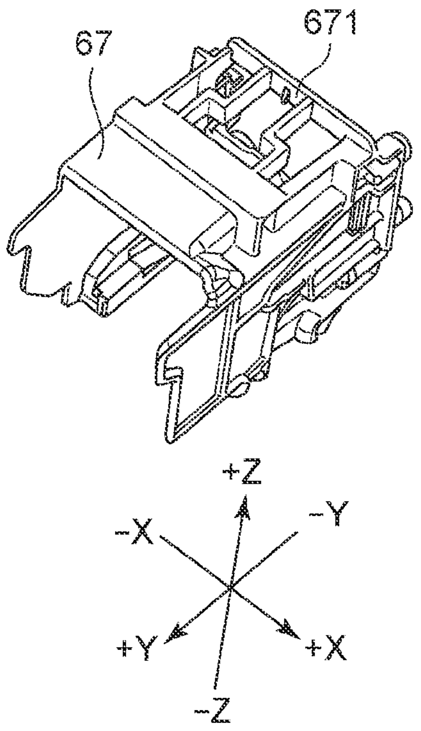
Figure 10C:
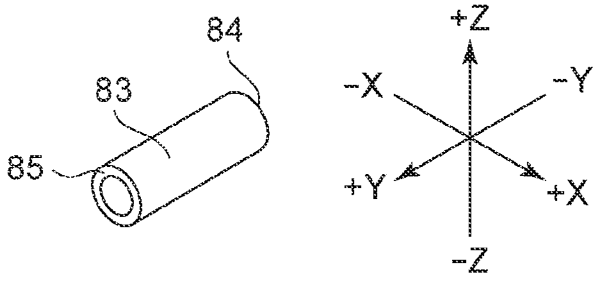
Figure 10D:
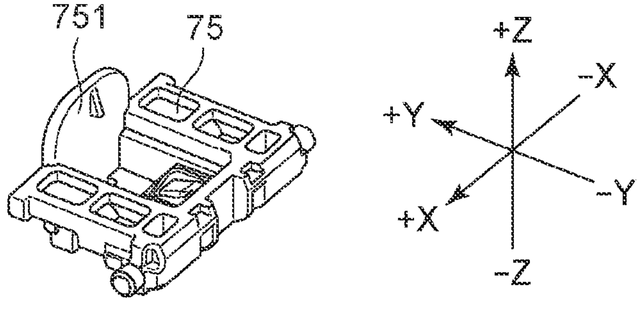

FIGS. 10A, 10B, 10C and 10D are perspective views illustrating the structure of a carriage unit 4 in the second embodiment according to the present disclosure. FIG. 10A is an external perspective view of the carriage unit 4. FIGS. 10B, 10C and 10D are external perspective views of a carriage 67, a compression spring 83, and the head set cam 75, respectively. As illustrated in FIG. 10A, the compression spring 83 is used as a biasing member for applying a load to the head set cam 75 and the carriage 67 in the substantially Y direction. The carriage 67 has an abutting surface 671 serving as a connecting portion that abuts an end 84 of the compression spring 83. The head set cam 75 has an abutting surface 751 serving as a connecting portion that abuts an end 85 of the compression spring 83.

Figure 11A:
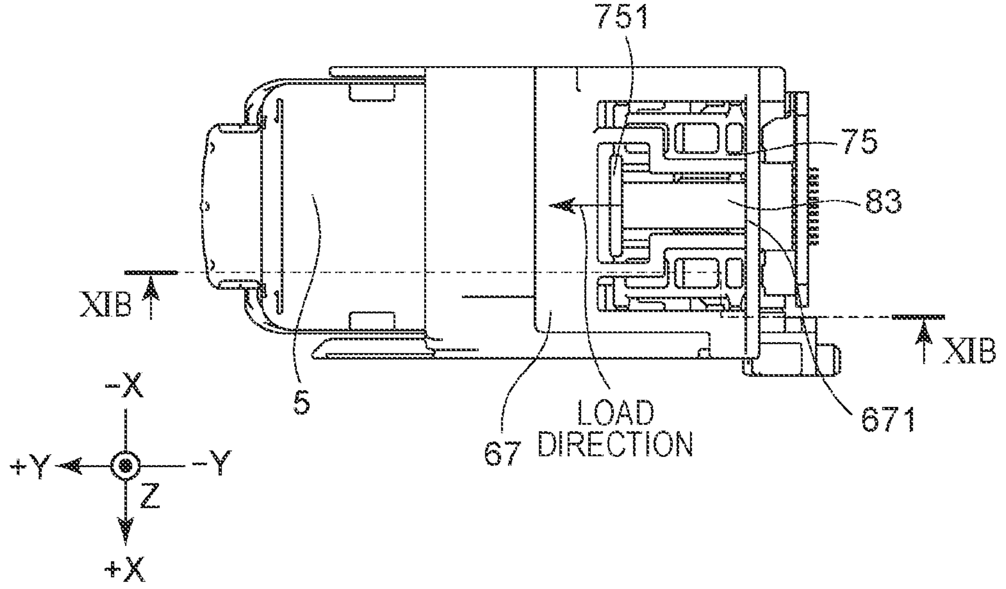
FIGS. 11A and 11B are a plan view and a sectional view, respectively, of the carriage unit in the second embodiment.
Figure 11B:
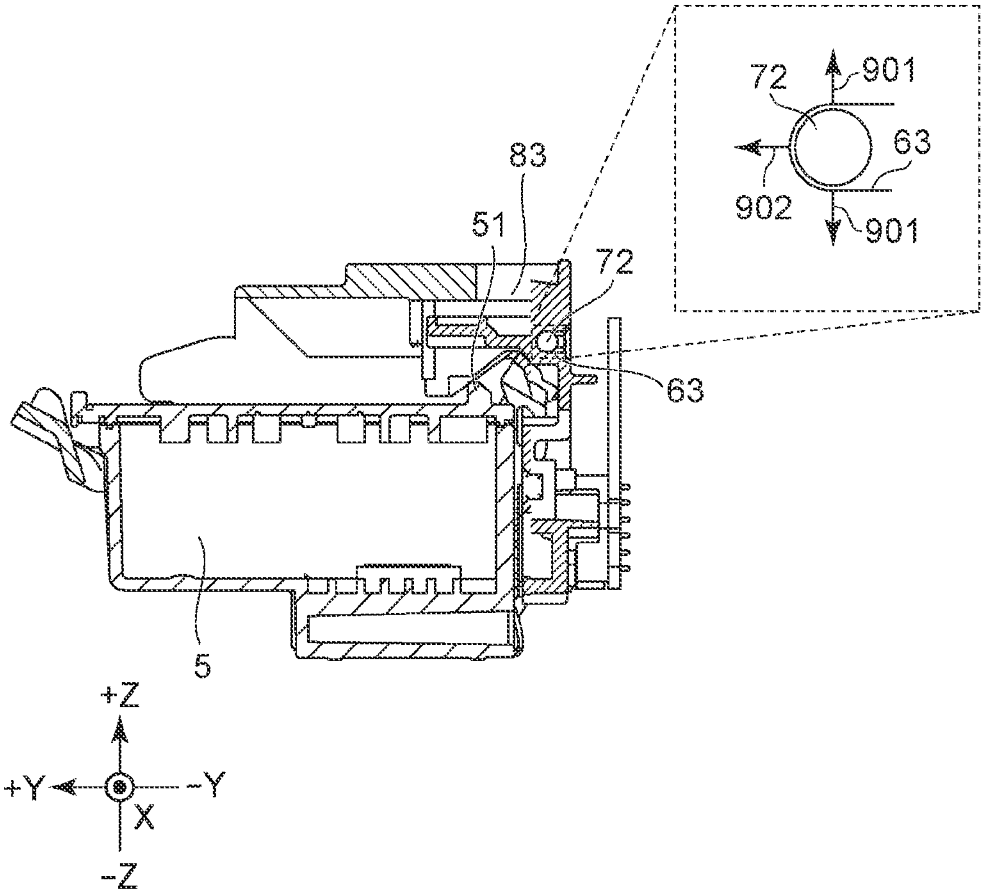

FIG. 11A is a plan view of the carriage unit 4 in the second embodiment, and FIG. 11B is a sectional view when looking at a cross-section of the carriage unit 4 cut along a line XIB-XIB in FIG. 11A from the +X direction. An area denoted by a dotted line in FIG. 11B represents a conceptual view illustrating a restricted state of the pivot shaft 72 and thereabout. In FIGS. 11A and 11B, the head set cam 75 is in the lock state, and the printing head 5 is fixedly held in the carriage unit 4. The load from the compression spring 83 is applied to the abutting surface 751 of the head set cam 75 in the −Y direction and to the abutting surface 671 of the carriage 67 in the +Y direction. As illustrated in the dotted-line area in FIG. 11B, therefore, the pivot shaft 72 of the head set cam 75 is restricted in the substantially Y direction (denoted by 902) and the substantially Z direction (denoted by 901) relative to the pivot shaft bearing portion 63 of the carriage 67.

Figure 12:
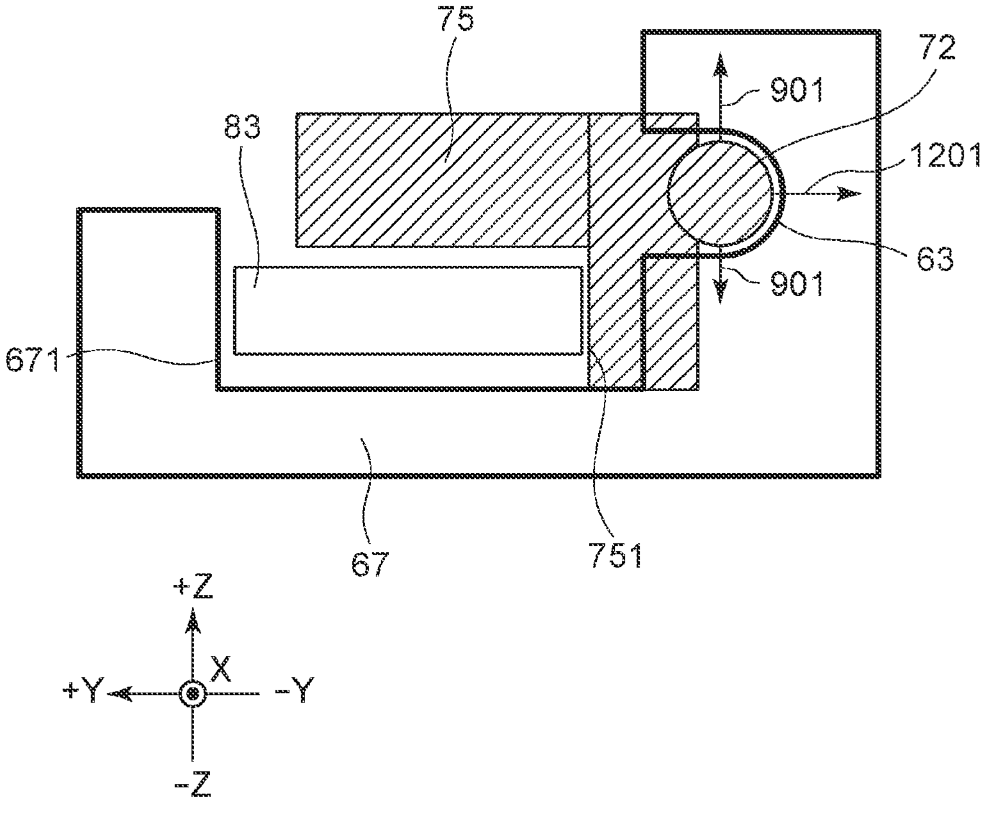
FIG. 12 is a conceptual view illustrating a restricted state of a pivot shaft in a modification of the second embodiment.

FIG. 12 is a conceptual view illustrating a restricted state of the pivot shaft 72 in a modification of the second embodiment. The biasing member for the head set cam 75 is the compression spring 83 as in FIGS. 10A to 10D and FIGS. 11A and 11B. In the illustrated structure, the load from the compression spring 83 is applied to the abutting surface 751 of the head set cam 75 in the −Y direction and to the abutting surface 671 of the carriage 67 in the +Y direction. Accordingly, the head set cam 75 receives force acting in the −Y direction based on the load applied to the abutting surface 751. In this modification, the pivot shaft bearing portion 63 restricting the pivot shaft 72 is configured to be open in the +Y direction. As a result, the position of the pivot shaft 72 is restricted in the substantially Y direction (denoted by 1201) and the substantially Z direction (denoted by 901) as illustrated in FIG. 12, and the load applied in the substantially Y direction is stabilized.

The support structure described in each of the first embodiment and the second embodiment is not limited to only the case of supporting the printing head 5, and the mechanism of the carriage unit 4 can be utilized as a support structure for fixedly holding a member to be supported. A support unit constituted by a support member utilizing the mechanism of the carriage unit 4 and a to-be-supported member supported by the support member can be widely applied to fields of mechanical apparatuses because the support unit can fixedly hold the to-be-supported member without increasing the apparatus size.

As described above, the present disclosure can provide the printing apparatus capable of preventing an increase in apparatus size in the height direction.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-108167, filed Jun. 29, 2021, which is hereby incorporated by reference herein in its entirety.

What is claimed is:

1. A printing apparatus comprising:

a support member including a bearing portion and supporting a printing member configured to perform printing on a printing medium;

a locking member, including a shaft portion fitted to the bearing portion, which is pivotally mounted to the support member with the shaft portion being a pivot center, and configured to fixedly hold the printing member relative to the support member; and a biasing member configured to fixedly hold the printing member in the support member with biasing, wherein a first direction forms an angle of 0 degree or greater and smaller than 45 degrees relative to an upper surface of the printing member in a first state in which the printing member is fixedly held relative to the support member by the locking member, and wherein, the biasing member is attached to the support member and to the locking member in a posture lying in a plane arranged in the first direction so as to restrict movement of the shaft portion fitted to the bearing portion in the first direction and to bias the support member and the locking member using a spring force applied in the first direction.

2. The printing apparatus according to claim 1, wherein the first direction is a direction substantially parallel to the upper surface of the printing member.

3. The printing apparatus according to claim 1, wherein the angle formed between the first direction and the upper surface of the printing member is greater than an angle providing a substantially parallel relation and smaller than 45 degrees.

4. The printing apparatus according to claim 1, wherein the printing member includes a substrate and, when the locking member is in the first state, the substrate contacts an electrical connector disposed on the support member to establish electrical connection.

5. The printing apparatus according to claim 1, wherein the biasing member is configured to bias the shaft portion in a second direction opposite to the first direction.

6. The printing apparatus according to claim 1, wherein each of the support member and the locking member includes a connecting portion, and the locking member is configured to be biased by the biasing member through the connecting portion.

7. The printing apparatus according to claim 1, wherein the locking member includes a storage portion, and the biasing member is disposed in the storage portion.

8. The printing apparatus according to claim 1, wherein the locking member is pivotally movable between the first state in which the locking member fixedly holds the printing member relative to the support member and a second state in which the locking member does not fixedly hold the printing member relative to the support member.

9. The printing apparatus according to claim 8, further comprising an operating member configured to be operated by a user to pivotally move the locking member between the first state and the second state.

10. The printing apparatus according to claim 9, wherein the locking member has a cam face that is formed as a curved surface and is in contact with the operating member.

11. The printing apparatus according to claim 10, wherein, when the locking member is pivotally moved between the first state and the second state in conjunction with an operation of the operating member, a rib formed on the operating member slides over the cam face in conjunction with the operation of the operating member.

12. The printing apparatus according to claim 9, wherein the operating member includes a grip portion configured to be used by the user to operate the operating member.

13. The printing apparatus according to claim 1, wherein the biasing member is a spring.

14. The printing apparatus according to claim 1, wherein the printing member is detachably attached to the support member.

15. The printing apparatus according to claim 1, wherein the printing member is configured to perform printing by ejecting a liquid toward the printing medium from an ejection portion, and the upper surface of the printing member is a surface opposite to a surface of the printing member in which the ejection portion is disposed.

16. The printing apparatus according to claim 1, wherein a press receiving portion is provided on the upper surface of the printing member and, when the printing member is in the first state, the press receiving portion is pressed by the locking member.

17. The printing apparatus according to claim 1, wherein the support member further including a support member attachment portion, the locking member further includes a locking member attachment portion, and the biasing member attached to the support member attachment portion of the support member and to the locking member attachment portion of the locking member.

* * * * *